Feb. 24, 1953  R. C. SNEED ET AL  2,629,479
EGG HANDLING MACHINE

Filed June 16, 1945  14 Sheets-Sheet 1

INVENTORS
ROBERT C. SNEED
CURTIS S. JORDAN
BY
ATTORNEY.

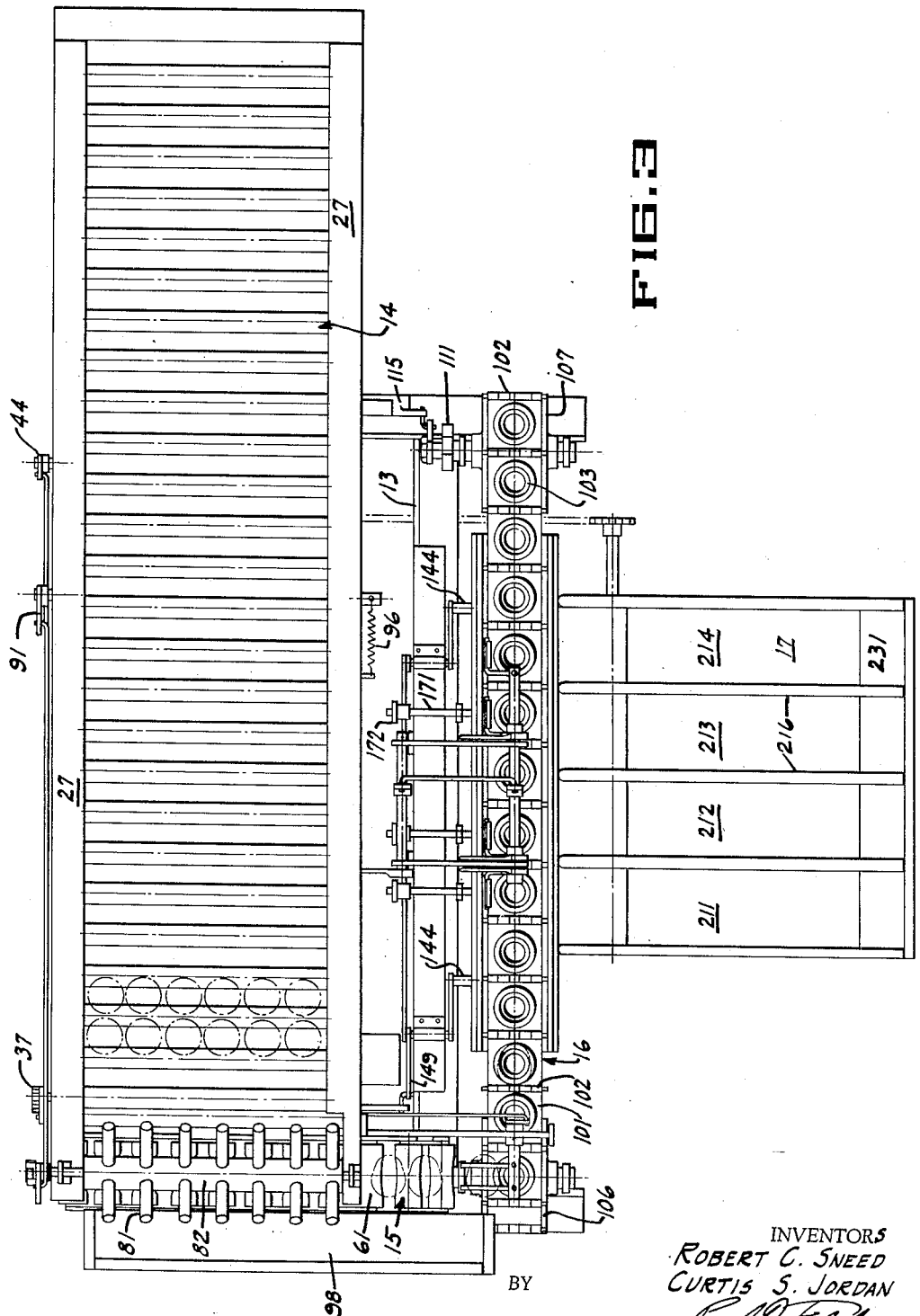

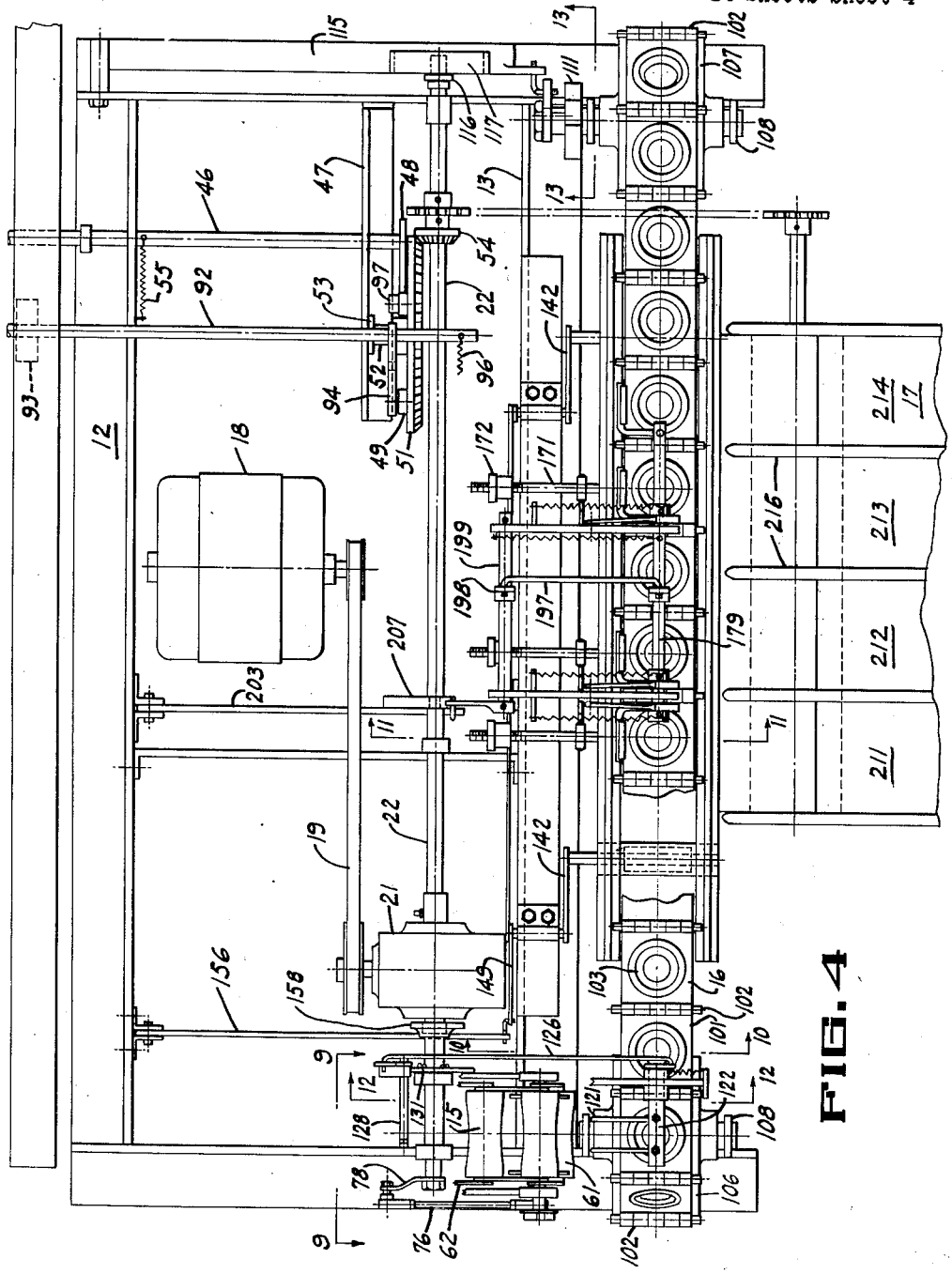

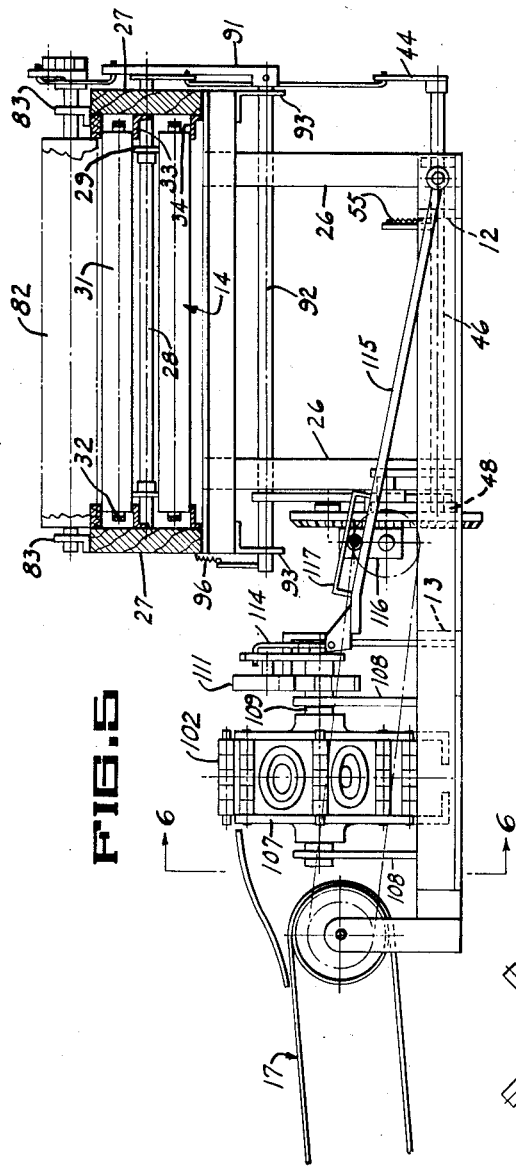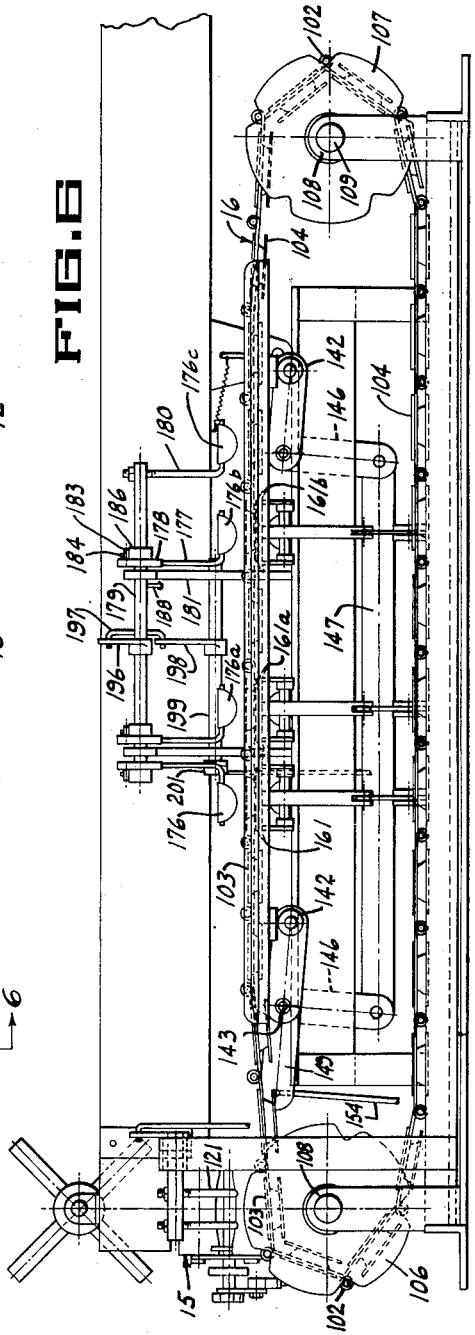

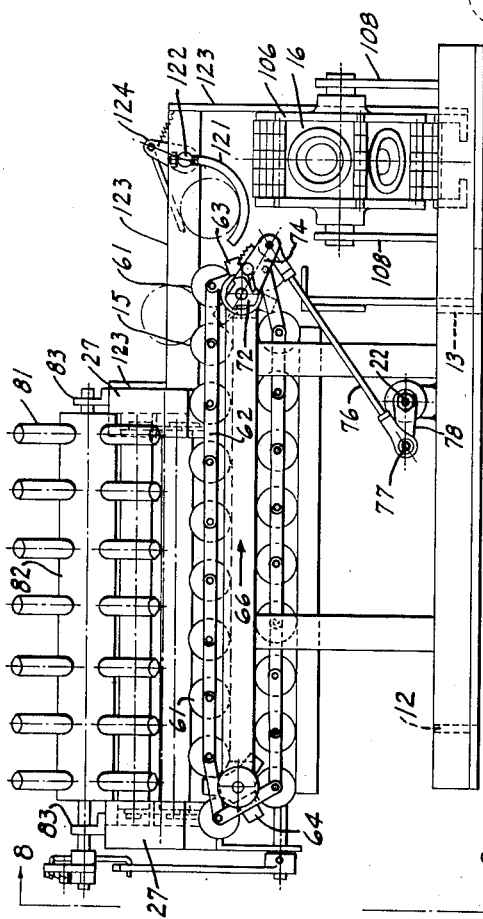

Feb. 24, 1953　　　R. C. SNEED ET AL　　　2,629,479
EGG HANDLING MACHINE
Filed June 16, 1945　　　　　　　　　　　　14 Sheets-Sheet 7
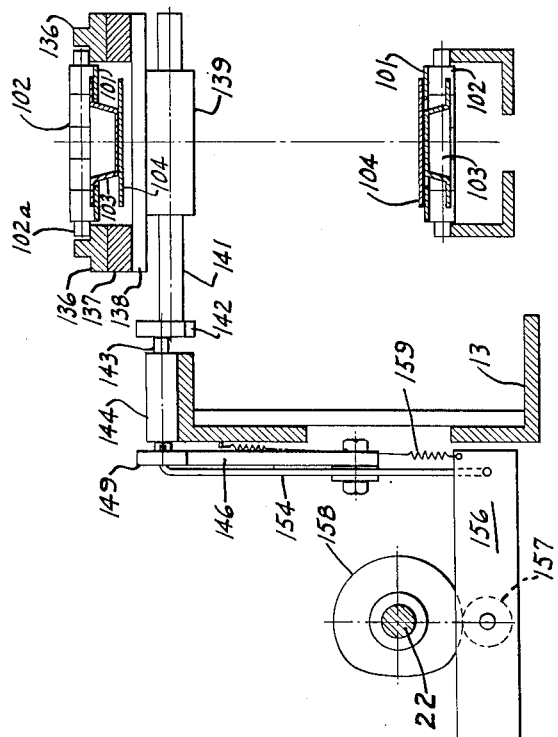
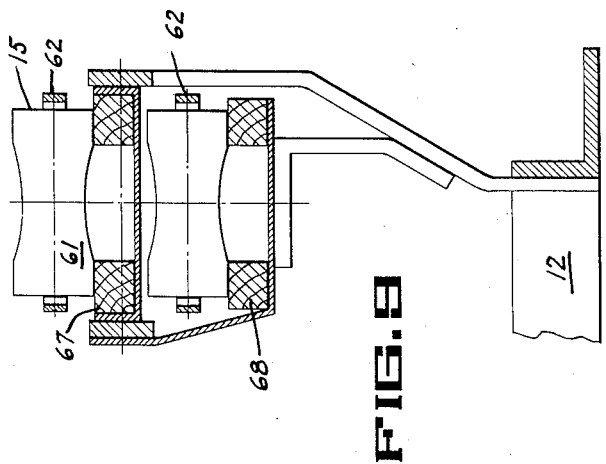
INVENTORS
ROBERT C. SNEED
BY CURTIS S. JORDAN
ATTORNEY

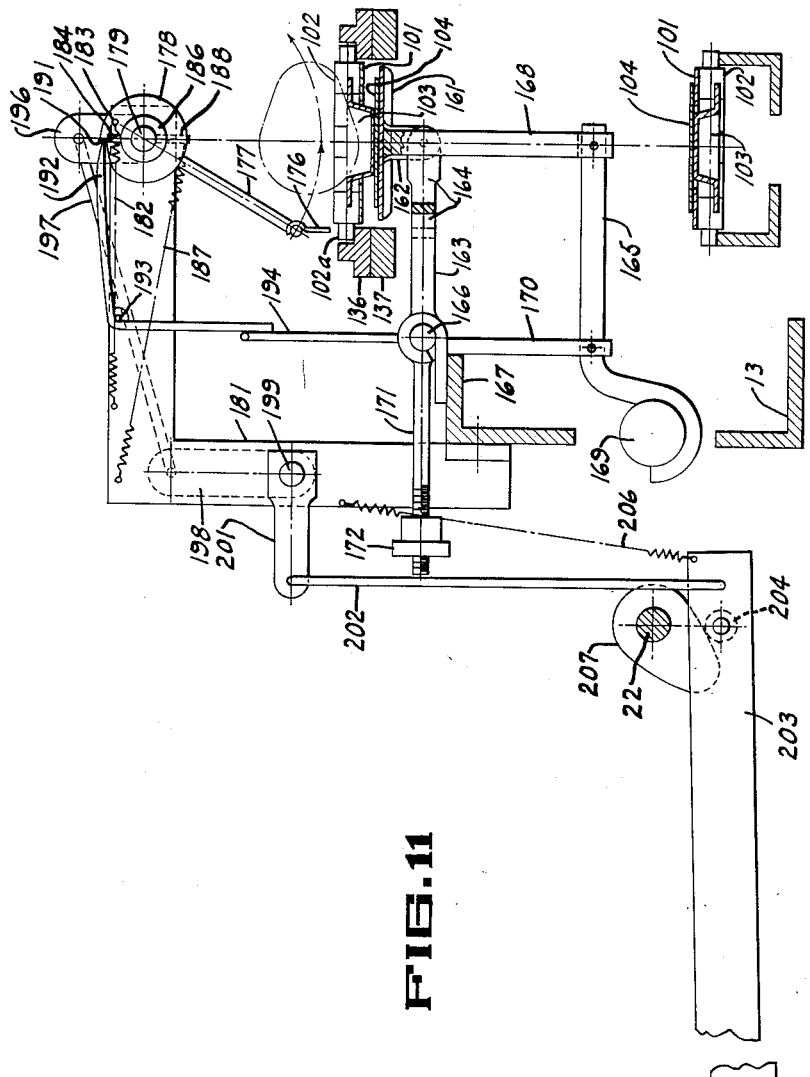

Feb. 24, 1953    R. C. SNEED ET AL    2,629,479
EGG HANDLING MACHINE
Filed June 16, 1945    14 Sheets-Sheet 9

INVENTORS
ROBERT C. SNEED
BY CURTIS S. JORDAN
ATTORNEY

Feb. 24, 1953  R. C. SNEED ET AL  2,629,479
EGG HANDLING MACHINE
Filed June 16, 1945  14 Sheets-Sheet 10

INVENTORS
ROBERT C. SNEED
CURTIS S. JORDAN
BY
ATTORNEY.

Feb. 24, 1953 R. C. SNEED ET AL 2,629,479
EGG HANDLING MACHINE
Filed June 16, 1945 14 Sheets-Sheet 11
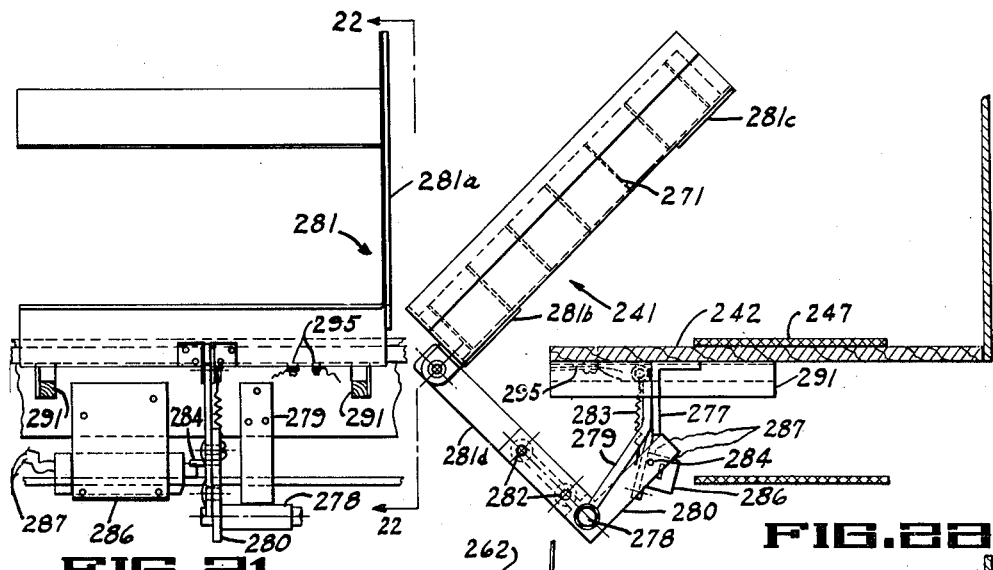
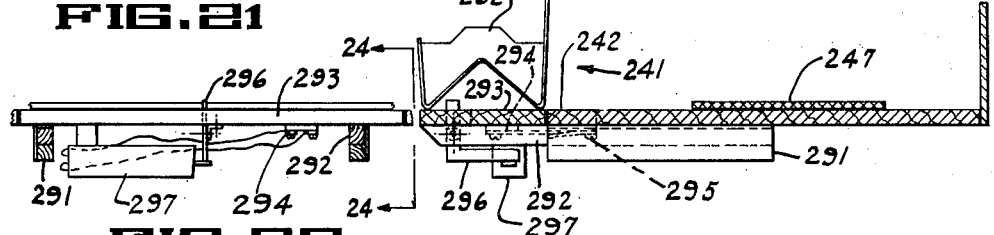
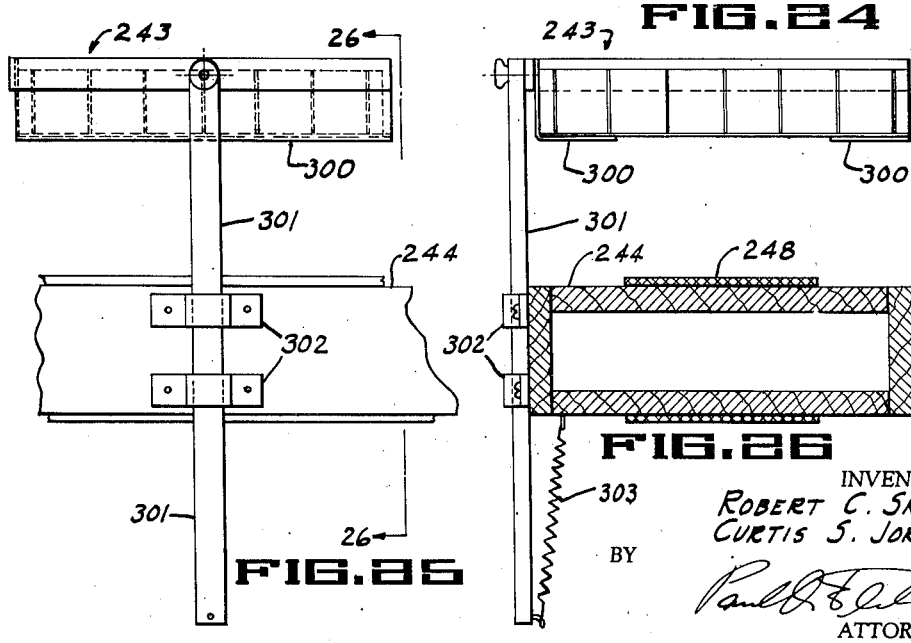
INVENTORS
ROBERT C. SNEED
CURTIS S. JORDAN
BY
ATTORNEY.

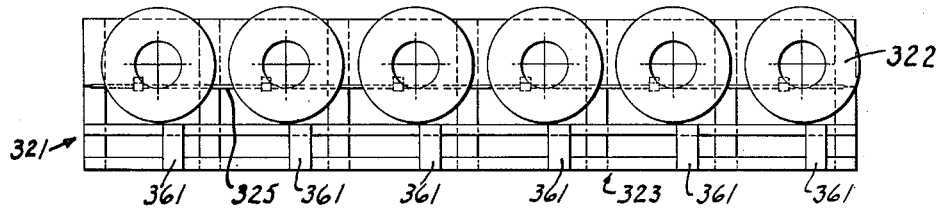
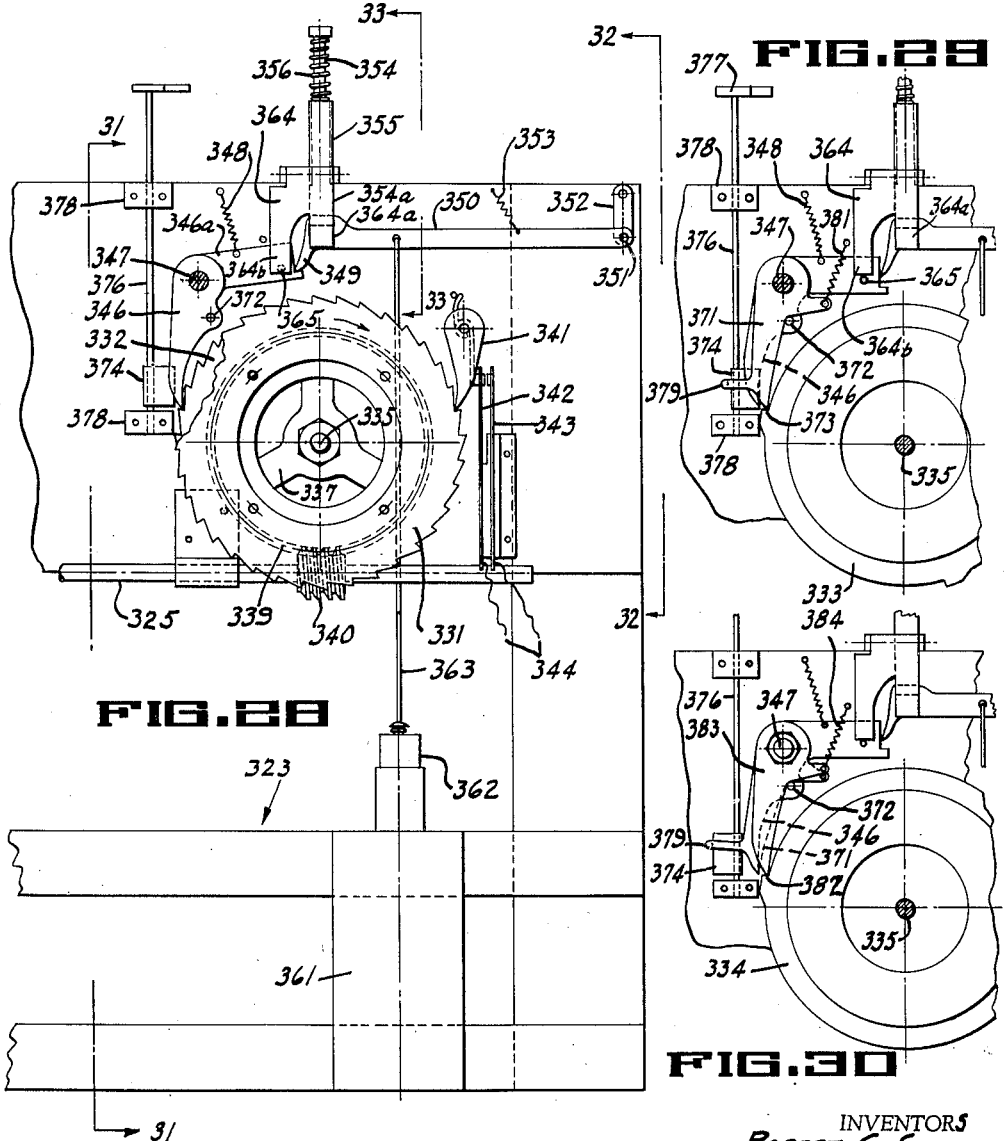

Feb. 24, 1953 R. C. SNEED ET AL 2,629,479
EGG HANDLING MACHINE
Filed June 16, 1945 14 Sheets-Sheet 13

INVENTORS
ROBERT C. SNEED
CURTIS S. JORDAN
BY
ATTORNEY.

Feb. 24, 1953 R. C. SNEED ET AL 2,629,479
EGG HANDLING MACHINE
Filed June 16, 1945 14 Sheets-Sheet 14

INVENTORS
ROBERT C. SNEED
BY CURTIS S. JORDAN
ATTORNEY

Patented Feb. 24, 1953

2,629,479

UNITED STATES PATENT OFFICE 2,629,479

EGG HANDLING MACHINE

Robert C. Sneed, Piedmont, and Curtis S. Jordan, Glendale, Calif., assignors to Safeway Stores, Incorporated, Oakland, Calif., a corporation of Maryland Application June 16, 1945, Serial No. 599,910

2 Claims. (Cl. 198—25)

This invention relates to egg-handling machines and is concerned more particularly with machines of this character which operate to grade the eggs by weight and to facilitate subsequent candling and packaging of the eggs by quality.

In the marketing of eggs it is customary to grade the eggs by weight into a plurality of sizes and then within the sizes to perform a quality-grading operation, as by candling, and to package the eggs in appropriate numbers in carton containers, for example, by the dozen or the three dozen. In performing this operation it is desirable to handle a large number of eggs with minimized breakage and to so control the flow of eggs through the machine that a minimum of effort is required on the part of the operator or operators in performing the various grading and packing operations.

It is a general object of the invention to provide an improved egg-handling machine which facilitates packaging of the eggs graded according to size and quality.

Another object of the invention is to provide an improved machine of the above character wherein the eggs can be separated into their various sizes and separately conveyed to a common candling and packaging station.

Another object of the invention is to provide an improved egg-handling apparatus in which the eggs are received in bulk arrangement and are subsequently arranged in single file for an egg-grading operation.

Another object of the invention is to provide improved egg-handling equipment including means for gently transferring eggs from one conveyor to another.

Another object of the invention is to provide improved egg-handling equipment including means providing a convenient arrangement of egg receiving cartons at a packaging station.

Other objects and advantages of the invention will be apparent from the following description of a preferred embodiment thereof, as illustrated in the accompanying drawings, in which:

Figure 3 is a plan view of the egg grading portion of the machine.

Figure 4 is a plan view of the egg grading portion of the machine with the bulk conveyor omitted and certain parts of the weighing conveyor partially broken away for better illustration of the subject matter.

Figure 5 is a right end view, partially in section, of the egg grading equipment shown in Figure 3.

Figure 6 is an elevational view of the egg grading equipment taken as indicated by the line 6—6 in Figure 5.

Figure 7 is an end elevational view of the left end of the egg grading apparatus as shown in Figure 3.

Figure 8 is an elevational view of the apparatus taken as indicated by the line 8—8 in Figure 7.

Figure 9 is a detail sectional view of the single file egg conveyor taken as indicated by the line 9—9 in Figure 4.

Figure 10 is a sectional detail view of a part of the egg grading apparatus taken as indicated by the line 10—10 in Figure 4, and showing means for raising and lowering the egg weighing conveyor.

Figure 11 is a sectional view of the egg grading apparatus taken at one of the weighing stations and indicated by the line 11—11 in Figure 4.

Figure 21 is a view similar to Figure 19 but showing a modified arrangement of the carton holder for use in automatically counting the eggs placed in the carton.

Figure 22 is a sectional view of Figure 21 taken as indicated by the line 22—22 in Figure 21.

Figure 23 is an elevational view of a holder for a dozen carton at the packaging station of the machine.

Figure 24 is a sectional view through the holder shown in Figure 23 as indicated by the line 24—24 therein.

Figure 25 is an elevational view of a modified holder for a carton of thirty-six eggs.

Figure 26 is an elevational view partly in section of the holder shown in Figure 25 and taken as indicated by the line 26—26 in Figure 25.

Figure 27 is a schematic plan view showing the arrangement of the various counting devices at the packaging station.

Figure 28 is a plan view of one of the counting devices and related parts.

Figure 29 is a fragmentary detail view similar to Figure 28 showing the position of the parts for counting eggs in dozen lots.

Figure 30 is a view similar to Figure 28 showing the position of the parts for counting eggs in three dozen lots.

Figure 35 is a fragmentary plan view showing the arrangement of the counter operating mechanism above the weighing conveyor.

Figure 36 is a sectional view of the mechanism shown in Figure 35 taken as indicated by the line 36—36 therein.

Figure 37 is a view similar to Figure 36 but showing the parts in a different operative position thereof.

Figure 1:
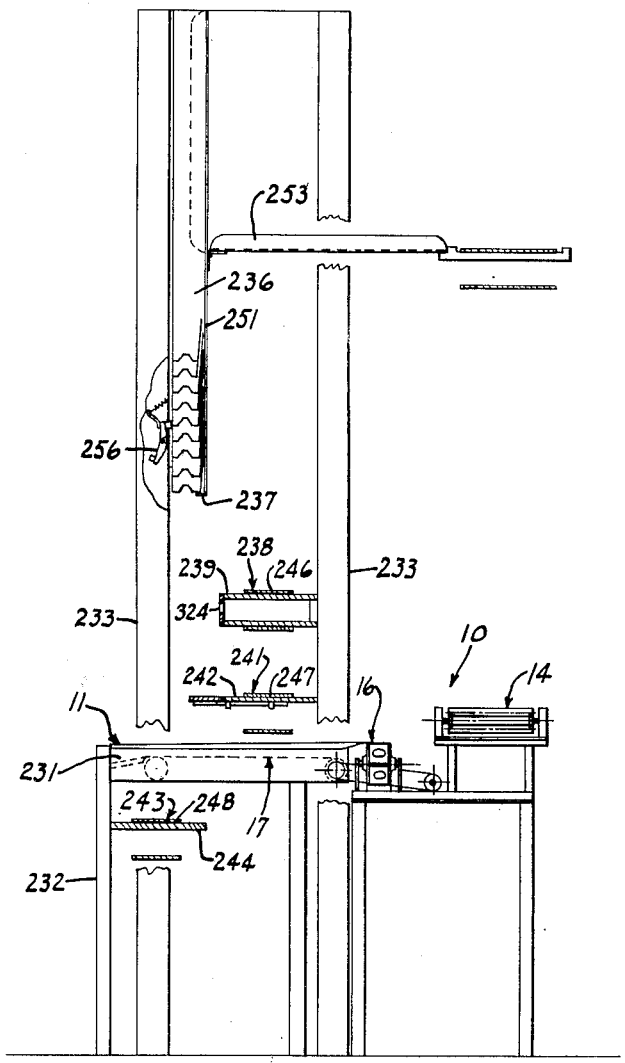
Figure 1 is a side elevational view of the egg-handling equipment.
Figure 2:
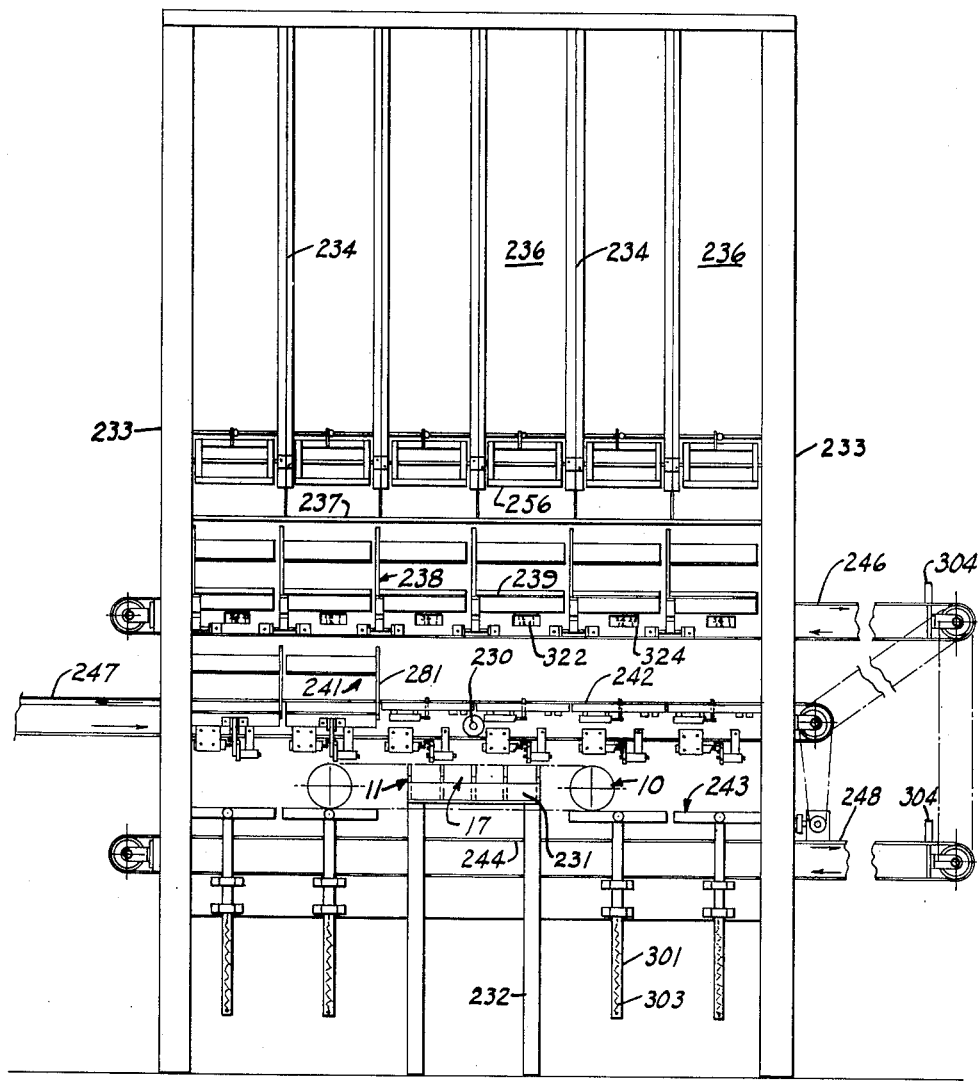
Figure 2 is a front elevational view of the machine illustrating the arrangement at the candling and packaging station.

As explained briefly above, the egg handling machine of this invention is designed to have eggs fed in bulk arrangement to the egg grading part of the apparatus where the eggs are separated as to size in a weight grading operation, and the various sizes are then fed to a candling and packaging station where the operator performs the quality grading operation and places the eggs in appropriately labeled cartons of one or more sizes. Referring to Figures 1 and 2, the apparatus includes a weight grading unit 10 in which the grading according to size is performed and a candling and packaging station and apparatus 11 to which the eggs are fed in separating sizes from the grading apparatus 10. The grading apparatus will now be described in detail.

Referring to Figures 1, 3, 4, 5 and 7, the egg grading apparatus adjacent frame portions 12 and 13 on which are supported a series of egg conveyors including a bulk or plural row conveyor 14, a single file conveyor 15, a weighing conveyor 16, and a discharge and feeding conveyor 17, all of these conveyors being driven in timed relation from a common drive motor 18. The drive motor 18 is connected through a belt and pulley drive 19 to a gear reduction box 21 from which the common drive shaft 22 extends for connection to the various operative parts of the apparatus.

Referring particularly to Figures 5 to 8, inclusive, the plural row conveyor 14 is supported by means of an auxiliary framework 26 upon which respective side frames 27 of the conveyor structure are mounted. The side frames 27 provide journaled mountings for a drive shaft 28 and a suitable idler shaft (not shown) having respective driving and idler sprockets 29 which engage the rollers 31 of the conveyor 14, the respective rollers 31 being connected adjacent each end by the links 32 of a similar pair of connecting and driving chains. The rollers 31 travel on respective upper rails 33 and lower rails 34 secured in a suitable fashion to the side frames 27. Thus it is seen that the plural row conveyor comprises an endless series of rollers providing a series of egg conveying troughs therebetween so that eggs deposited in the troughs will be carried along the upper stretch of the conveyor in the direction indicated by the arrow 36 in Figure 8. Eggs may be fed to the plural row conveyor 14 in indiscriminate fashion but are preferably fed thereto to form rows of six eggs. The eggs may be conveniently deposited on the conveyor in three dozen lots.

Figure 15:
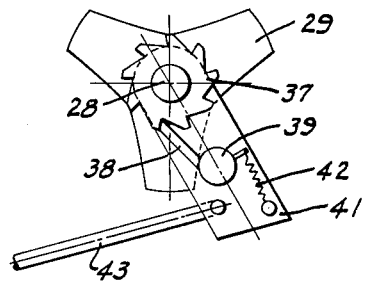
Figure 15 is an enlarged detail of the ratchet drive for the bulk or plural row egg conveyor.

To enable the timed drive of the conveyor in step-by-step fashion, the drive shaft 28 (Figures 8 and 15) is provided with a nine-tooth ratchet 37 which is adapted to be driven in step-by-step fashion by a pawl 38 pivoted at 39 on an operating lever 41 and urged into engagement with the ratchet wheel 37 by means of a spring 42. The operating lever 41 has a pivotal connection with an operating rod or link 43 which is pivotally connected to an arm 44 (Figure 8) secured on a shaft 46. The shaft 46 (Figures 4 and 8) is suitably journaled in an angle rail 47 of the frame and also has secured thereon an operating arm or member 48 which is disposed in the path of three equally spaced operating rollers 49 on a large bevel gear 51. The operating arm 48 is urged to engage the hub of the gear 51 by means of spring 55 connected to the frame and a pin on the shaft 46. The gear 51 is secured on a shaft 52 carried by a suitable bearing 53 on the rail 47 and is driven by the bevel pinion 54 on the drive shaft 22.

The gear ratio between pinion 54 and the bevel gear 51 is 1:6, so that the gear 51 receives one-sixth rotation for each rotation of the drive shaft 22 and the pinion 54. The rollers 49 on the gear 51 impart three steps of movement through the operating linkage to the ratchet 37 during one rotation of the gear 51 and the nine teeth of the ratchet 37 provide a one-third movement of the plural row conveyor 14 for each step of movement thereof. As a result, each six rotations of the drive shaft 22 produces a one-third rotation of the ratchet wheel 37 and a one-step movement of the plural row conveyor 14.

As will be seen from inspection of Figures 7 and 8, the single file conveyor 15 is disposed along the discharge end of the plural row conveyor 14 and transversely with respect to the path of travel thereof so as to receive the eggs in each row in single file thereon. The single file conveyor 15 (Figures 4, 7, 8 and 9) comprises a series of rollers 61 journaled at their ends in the respective links 62 of a pair of similar chains, the rollers 61 engaging a driving sprocket 63 and an idler sprocket 64 so that the upper stretch will travel in the direction of the arrow 66 (in Figure 7). Respective upper and lower tracks 67 and 68 (Figures 7 and 9) are provided for engaging the rollers 61 of the endless roller conveyor 15. Preferably, each roller 61 is contoured to provide a reduced diameter adjacent its central portion so that an egg supported by the adjacent rollers will be centered transversely of the single file conveyor. The engagement of the rollers 61 with the track 67 serves to rotate the egg engaged with a pair of adjacent rollers 61 and cause the egg to be positioned transversely of the conveyor.

Figure 14:
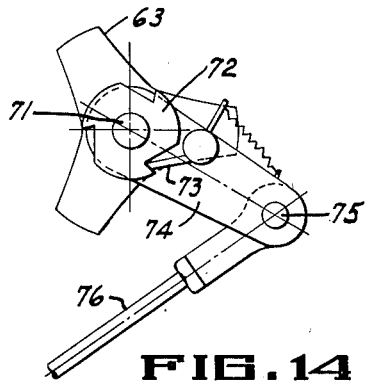
Figure 14 is an enlarged detail of ratchet drive for the single file egg conveyor.

In order to provide a step-by-step movement of the single file conveyor 15 in timed relation to that of the plural row conveyor 14, the supporting shaft 71 (Figures 4, 7 and 14) for the drive sprocket 63 is provided with a three-tooth drive ratchet 72 engaged by a spring-urged pawl 73 on an actuating arm 74 pivoted about the shaft 71. The actuating arm 74 is pivotally connected at 75 to a link 76 which is turn is pivoted at 77 (Figure 7) to an offset arm 78 secured on the drive shaft 22. In this way the ratchet 72 will be advanced one step and the conveyor 15 will also be advanced one step for each revolution of the drive shaft 22. In other words, the single file conveyor 15 will be advanced six steps for each single step advance of the plural row conveyor 14. In this way a row of six eggs on the single file conveyor can be advanced beyond the width of the plural row conveyor before another row of eggs is deposited from the plural row conveyor onto the single file conveyor.

In order to effect the transfer of eggs from the plural row conveyor to the single file conveyor a gentle action transfer means is provided including a series of four rows of resilient fingers 81, seven fingers to the row, secured in equal angular spacing to a supporting drum 82 (Figures 7 and 8) having supporting bearings 83 on the side frames 27 of the conveyor 14. The fingers 81 may be made of suitable resilient material such as rubber tubing.

Figure 16:
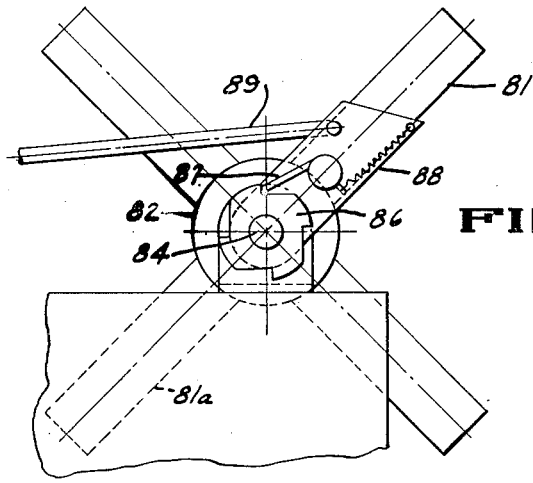
Figure 16 is an enlarged detail of the ratchet drive for the transfer means between the plural row conveyor and the single file conveyor.

Referring to Figure 8, if a row of eggs has just been discharged from the conveyor 14, they will be resting between adjacent rollers 31 of this conveyor and the adjacent row 81a of resilient fingers. If, with the parts in this condition, the fingers 81 be given a one-fourth rotation, the eggs will be gently deposited by fingers 81a into the adjacent troughs provided by the rollers 61 of the conveyor 15. For this purpose the supporting shaft 84 (Figures 8 and 16) of the drum 82 carries a four tooth ratchet 86 adapted for operation by a spring-urged pawl 87 on an operating arm 88. Arm 88 is connected by a link 89 with an arm 91 (Figure 8), secured on shaft 92 pivoted in depending brackets 93. The shaft 92 carries a depending arm 94 (Figures 4 and 8), which is urged by a spring 96 to engage the hub of the gear 51. The arm 94 (Figures 4 and 8) is disposed in the path of an extension 97 of one of the rollers 49 so that the arm 94, the shaft 92 and the transfer fingers 81 will be operated once for each revolution of the bevel gear 51, i. e., once for each six steps of movement of the single file conveyor 15.

The series of fingers 81 also serve to prevent overcrowding of the single file conveyor 15 in the event one or more eggs fail to feed therewith out of the path of the next row of eggs from the conveyor 14. For this purpose an egg receiving tray 98 (Figures 3 and 8) is secured on the frame adjacent the rollers 61 of the conveyor 15 so that the fingers 81 in transferring one row of eggs to the conveyor 15 will also clear the conveyor of any eggs remaining thereon which have not advanced beyond the discharge end of the conveyor 14.

The eggs from the single file conveyor 15 are deposited one by one onto the weighing conveyor 16 which may be of the general construction disclosed in the United States Letters Patent of R. C. Sneed and Curtis S. Jordan, No. 2,347,068, dated April 18, 1944, for Egg Grading Machine.

As explained in said patent, the weighing conveyor 16 comprises a series of apertured plates or links 101 (Figures 3, 4, 6 and 11) connected by similar hinged joints 102 and each link includes a movably mounted egg carrying cup 103. Each cup 103 has a bottom flange 104 which is secured in place after the cup portion is extended through the aperture of the associated link 101 so that the egg carrying cups remain secured within the links even in the inverted position shown for the lower stretch in Figure 11.

Referring to Figures 4 and 6, the pins of the hinged conections 102 have their ends disposed in spaced idler and drive sprockets 106 and 107, respectively, secured in upstanding bearings 108 on the frame. To provide a step-by-step drive of the weighing conveyor, the drive sprockets 107 have their shaft 109 extended to carry a drive sprocket 111 (Figures 3, 4, 5 and 13) having associated therewith a gravity type drive pawl 112 pivoted on a drive arm 113. The drive arm 113 is journaled on the shaft 109 and is connected by a link 114 with a lever 115 pivoted on the frame and provided with a bracket 117 (Figure 5) forming a slot which is engaged by a suitable drive roller on a drive arm 116. The arm 116 is secured on the shaft 22 so that the weighing conveyor is advanced one step for each rotation of the drive shaft 22.

Figure 12:
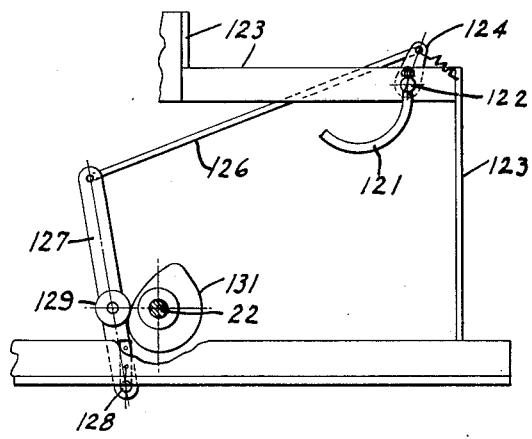
Figure 12 is a sectional view of the egg transfer means taken as indicated by the line 12—12 in Figure 4.
Figure 13:
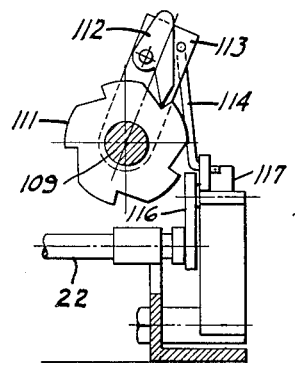
Figure 13 is a detail view of a part of the drive means for the egg weighing conveyor taken as indicated by the line 13—13 in Figure 4.

In order to transfer eggs one at a time from the single file conveyor 15 to the weighing conveyor 16 and to deposit each egg in an aligned weighing cup 103, an egg transfer means is provided in the form of a pair of arcuate fingers 121 (Figures 4, 7 and 12) secured on a shaft 122, which is journaled in supporting bars 123 of the frame. The fingers 121 are normally disposed, as seen in Figure 7, to receive an egg for transfer to the weighing conveyor 16. To operate the transfer fingers 121, the shaft 122 (Figure 12) is provided with an upstanding spring-urged arm 124 which is connected by a link 126 with an upstanding arm 127 pivoted at 128 on the frame of the machine. The arm 127 carries a roller 129 engaged with an operating cam 131 secured on the shaft 22. The shape of the cam 131 is such that after receiving an egg the transfer fingers 121 will be retracted slowly during the first portion of the cycle of the drive shaft 22 to effect a general depositing of the egg and will dwell during the middle portion of the cycle when the egg weighing conveyor 16 is being operated to remove the egg from in front of the transfer fingers 121. Subsequently the transfer fingers 121 will be rapidly advanced from their retracted position to the position shown in Figure 7 in time to receive the next egg upon advance of the single file conveyor 15.

After the eggs have been deposited one by one into the cups 103 of the weighing conveyor, the step-by-step advance of the weighing conveyor carries them past a series of weighing stations, at each one of which eggs of a predetermined size by weight will be ejected onto a corresponding run or portion of the discharge conveyor 17.

As explained in the above mentioned patent, during the step-by-step advance of the weighing conveyor the upper stretch of the conveyor is alternately raised and lowered to deposit the weighing cups onto aligned scales to perform the weighing operation. For this purpose the respective ends of the hinge pins 102a (Figures 6, 10 and 11) ride in tracks 136 carried by bars 137 of a framework including cross pieces 138 which have bushings 139 secured thereto. Each bushing 139 pivotally receives a supporting pin 141 carried at the end of an arm 142 secured on a supporting shaft 143 suitably journaled on a frame portion 144. Each shaft 143 (Figure 6) also carries a depending arm 146 and these arms are connected by a link 147 to insure parallel motion of the supporting linkage for the conveyor raising and lowering frame.

To actuate the weighing conveyor lowering and raising frame, the left hand shaft 143 (Figures 4 and 10) carries an arm 149 which is connected by a link 154 with the cam arm 156 having a roller 157 urged against a cam 158 by a spring 159. The cam 158 is secured on drive shaft 22 and is circular throughout the major portion of its periphery so that the arm 156 is held stationary during the time the weighing conveyor is being advanced and during the dwell in the advance of the weighing conveyor will be operated during the engagement of the flat portion of the cam 158 with the roller 157 to first lower and then raise the upper stretch of the weighing conveyor 16.

As previously explained, a plurality of weighing stations are provided past which the weighing conveyor moves and as these are similar only one will be described in detail.

Referring to Figures 6 and 11, each weighing station includes a scale platform 161 which is supported by a parallel motion linkage including its supporting legs 162 which are pivotally connected to forked end 164 of lever 163. The arm 163 is pivoted on the shaft 166 supported on a frame angle 167. A depending arm 168 parallel to the supporting legs 162 is connected to a lever 165 having a pivotal support in a depending stationary arm 170. A damping weight 169 is carried by the lever 165. Opposed to the arm 163 is a counterweight arm 171 having a threaded portion upon which a counterweight 172 is adjustably mounted so that the weight 172 opposes the combined weight of the platform 161, the weighing cup 103 and the egg in the weighing cup. The weight 172 is appropriately adjusted for the size of egg to be weighed.

Egg ejecting means in the form of an egg kick-off arm is provided for removing the egg from the aligned cup 103 and discharging it onto the adjacent discharge conveyor 17 if the egg is of sufficient weight to cause downward movement of the scale 161. For this purpose a kick-off plate 176 is provided (Figures 6 and 11) which is secured at the lower bent end of an arm 177 secured at its upper end in a collar 178 pivoted on a transverse shaft 179 suitably mounted on upright brackets 181. The collar 178 is spring urged counterclockwise, as viewed in Figure 11 by spring 182 connected between the frame and a pin 183 carried by the disc 178 and adapted to engage a pin 184 projecting radially from a collar 186 secured on the shaft 179. Spring 182 serves to operate the collar 178 and the kick-off arm 177 during the egg ejecting operation. Spring tension is applied to the shaft 179 by a spring 187 secured to a pin 188 in shaft 179 and to the frame to take up lost motion of the parts. The disc 178 is provided with a tooth 191 engaging a latch bellcrank 192 pivoted at 193 on the frame and engaged by an upstanding trip arm 194 connected to the parallel motion linkage 163, 164, etc., to be moved therewith.

Means are provided for periodically operating the shaft 179 to apply motion to the kick-off plate 176 through the disc 178 so that if the weighing operation has determined that the proper weight egg is in the cup the egg will be ejected therefrom. For this purpose the shaft 179 (Figures 6 and 11) carries an upstanding arm 196 connected by a link 197 to an upstanding arm 198 on a transverse shaft 199 pivoted in the frame. The shaft 199 also carries an arm 201 which is connected by a link 202 with a cam follower arm 203 having a roller 204 urged by a spring 206 into engagement with an operating cam 207 on the drive shaft 22.

The operation of the kick-off means or ejecting device is as follows: As the eggs are progressed by the weighing conveyor 16, the weighing cups 103 will be aligned in succession with the weighing scales including the platforms 161, 161a, 161b, and a final kick-off position with its kick-off arm 180 connected directly to the shaft 179. When the upper stretch of the weighing conveyor is lowered, the respective cups 103 will be deposited on the aligned weighing platforms. If the egg in the leftmost weighing cup 103 is of the heaviest weight, the platform 161 (Figure 11) will be moved downwardly in opposition to the counterbalance weight 172, and the trip arm 194 will operate the latch bellcrank 192 to release the aligned disc 178 so that the kick-off arm will be operated under the influence of its associated spring 182 to eject the egg onto the left portion 211 of the discharge conveyor 17 as viewed in Figure 3. During this operation, pin 183 follows pin 184 under the influence of spring 182. After an egg is ejected the pin 184 on shaft 179 engages the pin 183 and rotates the collar 178 against the tension of its spring 182 until the latch 192 again engages tooth 191 of collar 178.

If the egg is of insufficient weight to trip the leftmost weighing scale, it travels to the second weighing scale, platform 161a, where the next lighter egg size is ejected. If the ejecting device is tripped at this point, the egg will be ejected onto the portion 212 of the conveyor 17. A similar operation will occur for eggs which are in the third egg weight and are aligned with the kick-off plate 176b. If the egg is too light for the third ejecting position, it will be ejected by the final kick-off plate 176c onto the stretch or run 214 of the discharge belt 17. Partition members 216 separate the various portions of the discharge belt 17.

After the eggs have been separated according to weight by the grading mechanism described above, they are carried in separated portions by the discharge conveyor 17 to a candling and packaging station including a bin 231 (Figures 1 and 2) supported by legs 232 at the discharge end of the conveyor 17 to accumulate the eggs at the station 11 and having separate compartments for the various sizes of eggs. A candling lamp 230 is provided above the bin 231.

Figure 17:
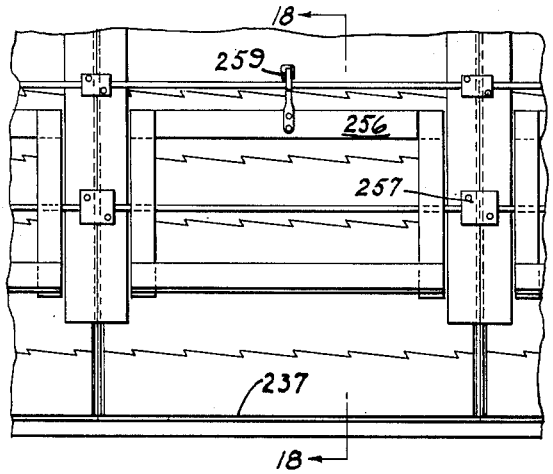
Figure 17 is a fragmentary enlarged elevational view of one of the carton feed mechanisms at the packaging station.
Figure 18:
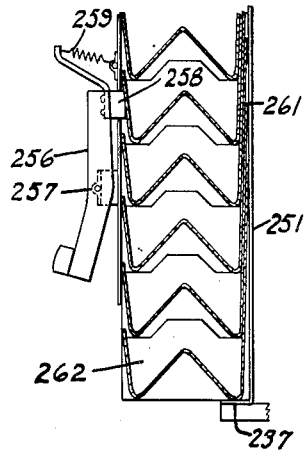
Figure 18 is a sectional view taken as indicated by the line 18—18 in Figure 17.

The station 11 includes an upright frame 233 (Figures 1 and 2) which is divided at the top by vertical partitions 234 into a plurality of egg carton holding chambers 236, which terminate at a horizontal shelf or ledge 237 above a plurality of packaging stations including a row 238 over a shelf 239, a row 241 over a shelf 242 and a row 243 over the lowermost shelf 244. As seen in Figures 1 and 2, a plurality of conveyors 246, 247 and 248 are associated with the respective shelves 239, 242 and 244, so that filled cartons can be removed by these conveyors in a manner later described. The carton chambers 236, illustrated more clearly as to the dozen egg cartons in Figures 1, 17 and 18, are provided with a back wall 251 within which the cartons are counted on a retaining ledge 237 (Figure 18) with the lid portions of the cartons extending in overlapping fashion adjacent the wall 251. The hinged feed door 253 (Figure 1) is provided for receiving stacks of dozen egg size and three dozen egg size egg cartons and feeding them into the chamber or chute 236. A friction retaining device is provided for the cartons of the ledge 237, with the exception of the lowermost carton, including a rectangular frame 256 pivoted at 257 and having at its upper edge a pressure bar 258 which extends and engages the fifth carton from the bottom under the influence of the spring 259 so that all carton lids, except that of the lowermost carton are subjected to pressure of the spring by virtue of the overlapping relation of the lids, the lid second from the bottom ends at 261, as indicated in Figure 18. After pulling out the lowermost carton 262, the operator can move the releasing frame 256 to allow the cartons to slide down and feed the next one into the lowermost position.

Certain of the carton holding chambers 236 are employed for holding the desired supply of 36 egg cartons. The carton holders in the row 238 are the type for receiving 36 egg cartons, as illustrated at 271 in Figures 19 and 20 and comprises an L-shaped frame 272 hinged at 273 on the front wall 274 of the shelf 239 to be normally supported in inclined position above the belt 246. The frame 272 includes supporting strap 272a and a pair of spaced apart carton supporting arms including angle arm 272b and strip arm 272c. After the carton 271 is full, if the frame 272 is urged clockwise as viewed in Figure 20 against the tension of spring 276, the bottom of the carton 271 will be engaged with the belt 246 so that the carton will be automatically removed from the holder frame 272.

The next packing row or station 241 is adapted for use either with a 36 egg carton or with a 12 egg carton to perform automatically counting operations in a manner later described. The shelf 242 of this row (Figures 21 and 22) may be equipped with a depending frame angle 277 having a supporting bracket 279 extending downwardly therefrom. An L-shaped supporting bell crank 280 is pivoted at 278 on the bracket 279 to provide a support for a removable carton bracket 281 generally similar to the bracket or holder 272 and having a support arm 281d releasably engaged with pins 282 on the bell crank 280. The bell crank 280 is urged counterclockwise by the spring 283 to maintain the carton holder 281 and the carton 271 in the inclined position shown. In this position the contact operating pin 284 on the bell crank 280 is spaced from the contact assembly 286 secured on the angle bracket 277 and adapted to be operated by the bell crank 280 upon clockwise movement thereof to close a counting circuit through the leads 287 in a manner later described.

For use with the dozen egg cartons the shelf 242 carries a pair of supporting ledges 291 adapted to receive an associated pair of supporting bars 292 of an auxiliary carton plate 293 adapted for abutting engagement with the edge of the shelf 242 with supporting bars 292 extending beneath the shelf 242 in engagement with the ledges 291. Also a pair of similar insulated and contact strips 294 are provided on the carton plate 293 to engage between corresponding pairs of insulated contact strips 295 on the shelf 242. Contact strips 294 are electrically connected to a switch 297 having a trip arm 296 projecting upwardly through the plate 293. Suitable leads extend from the pairs of strips 295 to a counter. A dozen egg carton 262 can be supported as shown in Figure 24 while the eggs are being inserted therein with the contact trip arm 296 disposed for operation by the carton when it is slid rearwardly after filling onto the discharge conveyor 247.

A modified form of a 36 egg carton holder is shown in Figures 25 and 26 wherein the carton frame 300 is mounted on upright arm 301 slidably carried in brackets 302 on the shelf 244 and urged upwardly by spring 303. Upon filling of the carton the holder 300 can be depressed until the carton is engaged by the conveyor 248 and fed out of the holder 300. Respective carton stops 304 are provided with conveyors 246 and 248 to hold the cartons until they are removed therefrom.

Figures 19, 20:
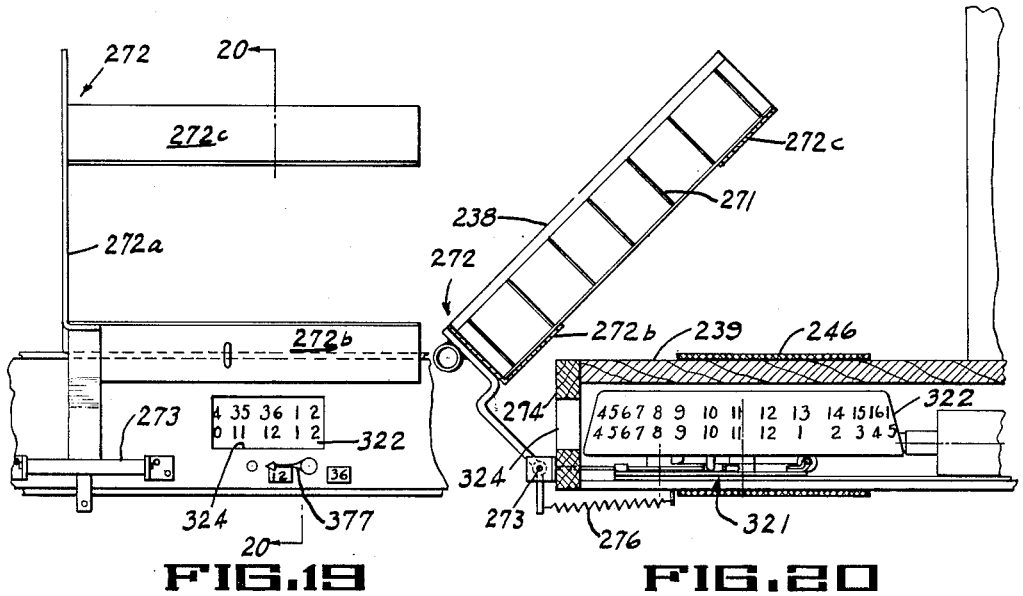
Figure 19 is an elevational view of a carton holding rack and an associated counter at the packaging station.
Figure 20 is a sectional view of the mechanism shown in Figure 19 as indicated by the line 20—20 therein.

As referred to above, a counting mechanism is provided for counting the various eggs packed in the cartons and for this purpose a series of counting devices 321 are shown in Figures 2, 20 and 27, being mounted below the shelf 239 and including numeral drums 322 mounted on respective supporting brackets 323 and adapted for viewing through the windows 324. A common drive shaft 325 (Figure 27) is provided for the various counting devices.

As each counting device is similar, only one will be described. Each counting device is adapted for manual operation to count eggs individually and for automatic operation, to count the eggs in units of dozens or of a selected number of dozens, in the present instance in units of three dozens as well.

The counter unit includes a ratchet wheel assembly including a 36 tooth contact operating ratchet 331, a 36 tooth ratchet 332 for manual counting, a three tooth ratchet 333 for counting in dozen units, and a one tooth ratchet 334 for counting in three dozen units. The ratchets are secured together in spaced relation and journaled about stationary shaft 335, and urged by a friction drive to turn clockwise, a viewed in Figure 28. The friction drive mechanism includes a friction disc 336 which engages the lower face of the ratchet 332, the parts being urged together by a three pronged spring member 337 secured on shaft 335 and engaging the upper face of the ratchet 332. The friction disc 336 is connected by a collar 338 to a worm wheel 339 having a drive worm 340 associated therewith.

Of the above ratchet wheels, ratchet 331 is an impulse transmitting ratchet wheel having a spring urged pawl 341 cooperating therewith and also carrying a contact closing arm 342 associated with the spring contact members 343, having leads 344 extending to a suitable counter.

The ratchets 332, 333 and 334 are escapement ratchets and are adapted for operation to cause escapement of the ratchet assembly for a given number of steps in accordance with a given number of eggs counted. The 36 tooth ratchet 332 is adapted for manual operation by means including an escapement pawl 346 (Figure 28) pivoted at 347 and urged in a counterclockwise direction by a spring 348. The tail 346a of the pawl 346 is engaged by the nose 349 of a lever 350 pivoted at 351 to a pivotal link 352 to provide a translational movement of the lever 350. A spring 353 is connected to the lever 350 to urge it to the left as viewed in Figure 28 and into engagement with the tail 346a of the release pawl 346. A manual operating plunger 354 is slidably mounted in a square tube 355 and is held inactive by a compression spring 356 which maintains the enlarged end 354a of the plunger 354 against the tube 355. Each depression of the manual operating plunger or key 354 will operate the lever 350 to cause the pawl 346 to release the ratchet wheel 332 and consequently the ratchet wheel 331 for one step of movement so that one impulse is supplied to the counter. The nose 349 of the lever 350 travels off of the tail 346a of the pawl 346 and is restored to the position shown in Figure 28 upon release of the plunger 354, thus providing single stroke operation of the plunger 354.

Figure 31:
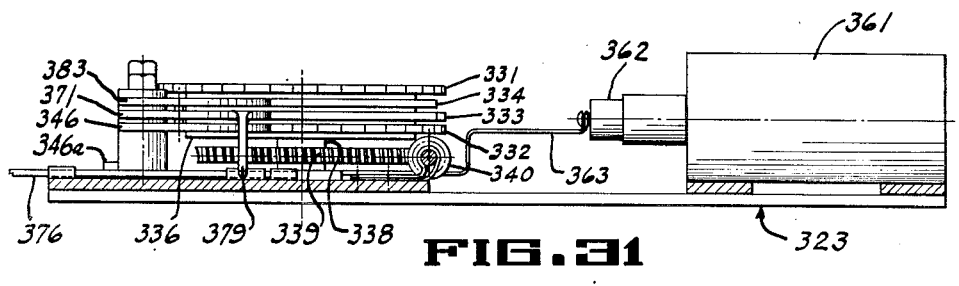
Figure 31 is an elevational view, partly in section, of the counting device shown in Figure 28 as indicated by the line 31—31 therein.
Figures 32, 33:
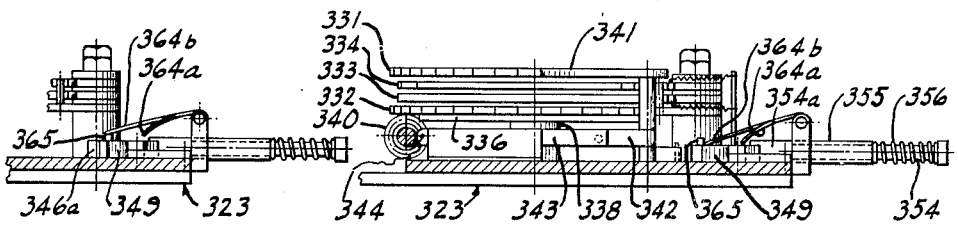
Figure 32 is another view of the counting mechanism shown as indicated by the line 32—32 in Figure 28 with the parts positioned for automatic counting.
Figure 33 is an elevational view, partly in section, of the counting device as indicated by the line 33—33 in Figure 28 with the parts positioned for manual counting of individual eggs.
Figure 34:
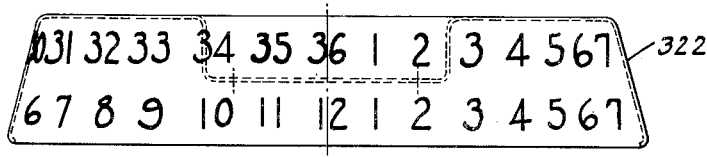
Figure 34 is a detailed view of the counting drum.

For automatic operation of the ratchet wheels a solenoid 361 (Figures 28 and 31) is provided which is operated by one of the sets of contact members 286 and 297, previously referred to, so that its armature 362 will be drawn within the solenoid and will operate the lever 350 through a link 363. Operation of the lever 350 by the solenoid 361 serves to disable the release pawl 346 for the single counting ratchet 332. For this purpose, a two arm gravity latch 364 is provided having one arm 364a operable by the plunger end 354a and a second arm 364b positioned for cooperation with a pin 365 on the tail 346a of the pawl 346. The arm 364b drops into latching engagement with the pin 365 upon operation of the lever 350 by the solenoid 361 and remains in this position until the plunger 354 is operated to perform a single count. When the plunger 354 is again operated to perform a single count plunger end 354a engages the arm 364a of the latch 364 to move the arm 364b of the latch from engagement with the pin 365 so that the pawl 346 can again engage the ratchet 332.

To provide for operation in counting the eggs in dozen lots with the three tooth ratchet 333 a second pawl 371 (Figure 29) is pivoted on the shaft 347 and adapted for abutting relation with a pin 372 on the pawl 346, the pawl 346 also serving as the operating means to release the pawl 371 from engagement with the associated tooth 373 of the ratchet 333. The pawl 371 as shown in Figure 29 is in operative relation with the ratchet 333, this condition being provided for by the positioning of a manually settable control including an eccentric 374 on a rod 376 having a pointer shaped handle 377 and journaled in spaced bearings 378. The eccentric 374 cooperates with a laterally extending and depending finger 379 of the pawl 371 to allow the pawl in the position shown in Figure 29 to engage the ratchet 333 under the influence of its spring 381. If the handle 377 is turned from the position shown in Figure 19 clockwise to alignment with the indicia 36 the eccentric 374 (Figure 29) is turned from the position shown to that shown in Figure 30 where the pawl 371 has been moved to its inactive position.

To enable counting in units of 36 eggs, the ratchet 334 is provided with a single tooth 382 cooperating with a pawl 383 also pivoted on the shaft 347 and having an associated spring 384 which serves to engage the pawl with the ratchet 334. The pin 372 on the pawl 346 also underlies the pawl 383 to operate this pawl upon energization of the solenoid 361.

From the above description it will be apparent that the ratchet assembly can be conditioned for automatic counting under control of the solenoid 361 in either units of one dozen or three dozen by appropriate setting of the control handle 377 so that when the lever 350 is operated by the solenoid 361 its nose 349 will engage the tail 346a of the pawl 346 and through the pawl 346 and its pin 372 release either the pawl 371 from its ratchet 333 or the pawl 383 from its ratchet 334. It will be noted that whenever the solenoid 361 is operated to initiate an automatic count, the pawl 346 becomes latched in inactive position after the initial operation by the lever 350 until it is again released by virtue of another manual count by operation of the manual counting plunger 354.

Figure 35:
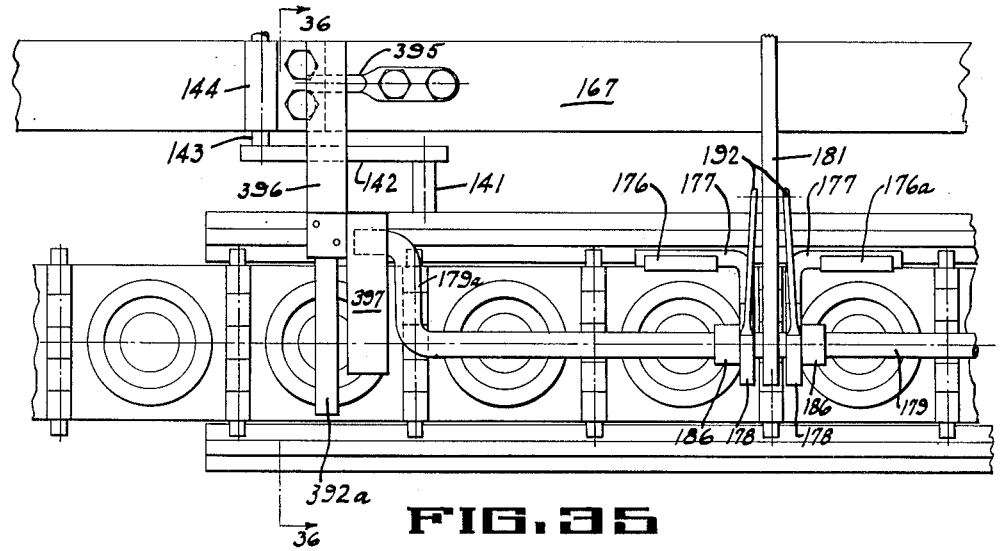
Figures 35 to 37 are views of a counter operating mechanism for counting the total number of eggs before they are graded by weight.
Figure 36:
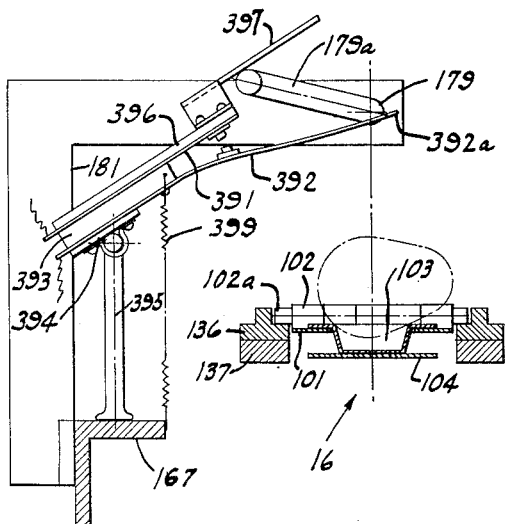
Figure 37:
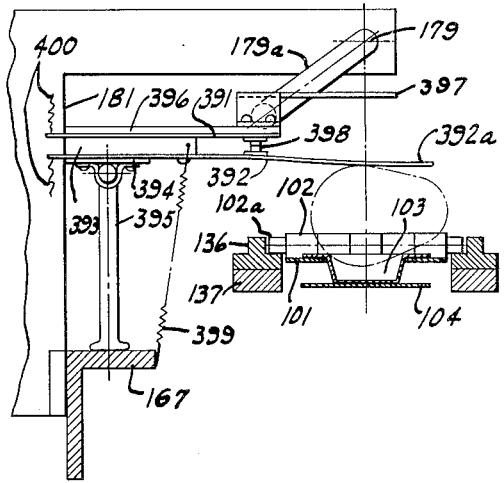

Figures 35 to 37 illustrate a counter actuating device for use in connection with a weighing conveyor to count the number of eggs before grading, and to provide a check on the number of eggs counted in the ratchet type counting device previously described. The counter actuating device includes a pair of spring contact arms 391 and 392 spaced apart by an insulating block 393 and having an insulated mounting 394 upon a supporting rod 395. The contact arm 391 carries an insulating strip 396 to support an offset control arm 397 which is used to control the raising and lowering of the contact arms 391 and 392 between the positions shown in Figures 36 and 37 under control of an offset end 179a of the shaft 179. The shaft 179 being operated once for each step of movement of the weighing conveyor 16 will lower the contact arms 391, 392 once for each step of movement so that the extended end 392a of the arm 392 will be lowered to engage an egg in the aligned cup 103 and close the contacts 398 if an egg is engaged. The spring 399 serves to move the arms 391, 392 downward as the shaft 179 is operated. If no egg is in the aligned cup 103 the contacts 398 will not be closed and no count will be made. The electric leads 400 extend from the contact arms 391 and 392 to the associated counting device of conventional construction.

The operation of the egg handling machine of our invention may be briefly summarized as follows: Eggs received for processing may be deposited manually, or by means of special egg handling devices, on the bulk conveyor 14, as illustrated in Figure 3, preferably in rows of six eggs to the row. The eggs are carried in step-by-step fashion by the bulk conveyor 14 until they arrive at the discharge end thereof, where a row of eggs will be deposited by the egg transfer fingers 81 (Figures 3 and 8) onto the single file conveyor 15.

It will be recalled that the single file conveyor 15 is moved in step-by-step fashion at a rate six times as great as that of the bulk conveyor 14, so that a row of eggs deposited on the single file conveyor will be moved from alignment with the discharge end of the bulk conveyor 14 before the next row of eggs is moved by the transfer fingers 81 from the bulk conveyor onto the single file conveyor. In the event any eggs have not progressed beyond the discharge end of the bulk conveyor 14, the transfer fingers 81 also serve to clear the single file conveyor 15 by discharging any eggs remaining thereon onto the egg receiving tray 98 (Figure 3).

The rotation of the rolls 61 of the single file conveyor 15 serves to align the eggs, as shown in Figure 3, for depositing onto the pair of arcuate egg transfer fingers 121 (Figures 3 and 7), which are operated in time with the step-by-step movement of the single file conveyor 15 to be positioned in egg-receiving relation (Figure 7) at the time an egg is discharged from the conveyor 15.

After receiving an egg, the transfer fingers 121 are retracted from the position shown in Figure 7 to deposit the egg onto the aligned egg weighing cup 103 of the egg weighing conveyor 16, which is also operated in step-by-step fashion in time with the operation of the single file conveyor 15 and the transfer fingers 121.

As the eggs are advanced on the weighing conveyor 16, they may be progressed past the egg counting device shown in Figures 35 to 37, where a count of the eggs is effected as they travel past the counting station. To effect the count, the contact arms 391 and 392 are closed when an egg is in the aligned cup 103.

Subsequently, the eggs on the weighing conveyor 16 are carried past a series of weighing stations including a series of scale platforms 161 and the egg ejecting plates 176, 176a, 176b and 176c (Figure 6). As previously explained, the heaviest eggs are ejected by the kick-off plate 176 onto section 211 (Figure 3) of the discharge conveyor 17, the next heaviest eggs are similarly ejected by the kick-off plate 176a onto the section 212 of the discharge conveyor, and the next two succeeding weights of eggs are ejected by the kick-off plates 176b and 176c onto the sections 213 and 214 respectively, of the discharge conveyor 17.

As previously explained, the discharge conveyor 17 extends to a plurality of egg receiving bins 231 at the candling and packaging station shown in Figures 1 and 2, including the candling lamp 239.

The various sizes of eggs are separately graded according to quality, and are placed in egg holding cartons such as shown at 262 in Figure 18 or at 271 in Figure 20.

If the eggs are being packed in dozen cartons, the cartons 262 may be employed as shown in Figure 24. When the carton is filled it is slid to the right past the count tripping arm 296 for the "dozen" counting ratchet of the counting mechanism, and into the conveyor 247 for disposal in the usual manner.

If eggs are being packed in three-dozen cartons, the cartons may be positioned as shown for example in Figures 22 or 26. If automatic counting is desired, the holder as illustrated in Figure 22 may be employed, so that as the carton is transferred to the conveyor 247 by a downward tipping of the carton holder 241, the "three-dozen" count ratchet of the counting mechanism is released.

It will be understood that the above quality grading operations will be performed with respect to each of the sizes of eggs and they will be packed in appropriate cartons as pointed out above.

As the counting operation is performed, each particular quality and size of egg is counted on a particular counting drum 322 of the series shown in Figure 2, with the operation being controlled for "dozen" or "three-dozen" counts as indicated by the setting of the pointer 377 in Figure 19. It will be understood that where odd numbers of eggs are to be counted, the manually operable control key or button 354 is utilized for the counting operation.

While we have described our invention as illustrated in the preferred embodiment thereof, it will be apparent that the invention is capable of both variation and modification from the form shown, and its scope therefore should be limited only by the scope of the claims appended hereto.

We claim:

1. In an egg handling machine, a bulk conveyor for eggs comprising a series of troughs disposed transversely of the length of said conveyor, a file conveyor disposed transversely of and spaced below said bulk conveyor at the discharge end thereof, egg transfer means comprising a series of rows of transfer fingers radially disposed in angularly spaced relation about a common axis spaced above the discharge end of said bulk conveyor, means for effecting rotating movement of said egg transfer means to cause said rows of fingers to travel downwardly past said discharge end of said bulk conveyor, a third conveyor spaced below the discharge end of said file conveyor to receive eggs one at a time therefrom, a second transfer means including a pair of parallel arcuate fingers for receiving eggs one at a time from said file conveyor and depositing them upon said third conveyor, and means for moving said transfer fingers toward the discharge end of said file conveyor into egg receiving position therewith and for thereafter moving said transfer fingers away from said discharge end and into egg depositing position with respect to said third conveyor.

2. In an egg handling machine, a bulk conveyor for eggs comprising a series of troughs disposed transversely of the length of said conveyor, a file conveyor disposed transversely of and spaced below said bulk conveyor at the discharge end thereof, a third conveyor adapted to receive eggs one at a time from said file conveyor, a first egg transfer means comprising a series of rows of transfer fingers for successively controlling the depositing of successive rows of eggs from said bulk conveyor on to said file conveyor, a second transfer means for receiving eggs one at a time from said file conveyor and depositing them in predetermined aligned position on said third conveyor, and means for effecting successive cyclic movements of both said transfer means for successively controlling the depositing of successive rows of eggs from said bulk conveyor on to said file conveyor and for moving said second transfer device into egg depositing position with respect to said third conveyor in time with the movement of said file and third conveyors.

ROBERT C. SNEED.
CURTIS S. JORDAN.

REFERENCES CITED

The following references are of record in the file of this patent:

UNITED STATES PATENTS

| Number | Name | Date |
|---|---|---|
| 1,043,854 | Luellen | Nov. 12, 1912 |
| 1,092,609 | Taliaferro | Apr. 7, 1914 |
| 1,111,549 | Staffel | Sept. 22, 1914 |
| 1,200,244 | Sears | Oct. 3, 1916 |
| 1,241,525 | Leatherbee | Oct. 2, 1917 |
| 1,273,604 | Gallup et al. | July 23, 1918 |
| 1,343,875 | Reese | June 15, 1920 |
| 1,382,522 | McKeand | June 21, 1921 |
| 1,702,573 | Ringler | Feb. 19, 1929 |
| 1,922,717 | Smitt | Aug. 15, 1933 |
| 1,963,791 | Keller | June 19, 1934 |
| 2,052,840 | Nussbaum | Sept. 1, 1936 |
| 2,135,778 | Wyland | Nov. 8, 1938 |
| 2,244,430 | Parsons et al. | June 3, 1941 |
| 2,278,342 | Ziegler | Mar. 31, 1942 |
| 2,283,615 | Skinner et al. | May 19, 1942 |
| 2,379,911 | Kottmann | July 10, 1945 |